United States Patent
Jang et al.

(10) Patent No.: US 6,451,934 B1
(45) Date of Patent: Sep. 17, 2002

(54) PROCESS FOR PREPARATION OF HIGH 1,4-CIS POLYBUTADIENE

(75) Inventors: Young Chan Jang; A Ju Kim; Gwang Hoon Kwag; Seung Hwon Lee, all of Taejon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 09/539,999

(22) Filed: Mar. 30, 2000

(30) Foreign Application Priority Data

Jun. 17, 1999 (KR) .............................. 99-22727

(51) Int. Cl.$^7$ .................... C08F 4/52; C08F 136/06; C08F 4/70
(52) U.S. Cl. .................... 526/117; 526/113; 526/340.4; 526/164; 526/169.1; 502/107; 502/113; 502/125; 502/132
(58) Field of Search ................. 526/117, 133, 526/340.4, 169.1, 164

(56) References Cited

U.S. PATENT DOCUMENTS

| | | | |
|---|---|---|---|
| 4,242,232 A | 12/1980 | Sylvester et al. | 252/429 C |
| 4,260,707 A | 4/1981 | Sylvester et al. | 526/114 |
| 4,699,962 A | 10/1987 | Hsieh et al. | 526/142 |
| 4,906,706 A | 3/1990 | Hattori et al. | 525/343 |
| 5,017,539 A | 5/1991 | Jenkins et al. | 502/102 |
| 5,064,910 A | 11/1991 | Hattori et la. | 525/359.1 |
| 5,283,294 A | * 2/1994 | Hsu et al. | 525/247 |
| 6,136,931 A | * 10/2000 | Jang et al. | 526/133 |

FOREIGN PATENT DOCUMENTS

| | | | |
|---|---|---|---|
| EP | 0127236 | 12/1984 | ......... C08F/136/06 |
| EP | 0375421 | 6/1990 | ......... C08F/136/06 |
| EP | 0667357 | 8/1995 | ........... C08F/36/04 |
| WO | 9305083 | 3/1993 | ........... C08F/36/04 |

* cited by examiner

Primary Examiner—David W. Wu
Assistant Examiner—Caixia Lu
(74) Attorney, Agent, or Firm—Davidson, Davidson & Kappel, LLC

(57) ABSTRACT

This invention relates to a process for preparation of high 1,4-cis polybutadiene and more particularly, to the process for preparing polybutadiene by polymerizing 1,3-butadiene monomer in the presence of a catalyst prepared by aging a mixture of a neodymium salt compound, a nickel salt compound, an organoaluminium compound and a borontrifluoride complex compound in the presence or absence of a conjugated diene compound. With much remarked catalytic activity, polybutadiene with a very high 1,4-cis content can be prepared in a high yield using a small amount of catalyst.

9 Claims, No Drawings

PROCESS FOR PREPARATION OF HIGH 1,4-CIS POLYBUTADIENE

FIELD OF THE INVENTION

This invention relates to a process for preparation of high 1,4-cis polybutadiene and more particularly, to the process for preparing polybutadiene by polymerizing 1,3-butadiene monomer using a catalyst prepared by aging a mixture of a neodymium salt compound, a nickel salt compound represented by the following formula I, an organoaluminium compound and a borontrifluoride complex compound represented by the following formula II and formula III in the presence or absence of a conjugated diene compound. With much remarked catalytic activity, polybutadiene with a very high 1,4-cis content can be prepared in a high yield using a small amount of catalyst.

$$Ni(OOC-R)_2 \quad \text{Formula I}$$

Wherein, R is an alkyl group, a cycloalkyl group, an aryl group or an arylalkyl group containing from 6 to 20 carbon atoms.

$$BF_3OR_1R_2 \quad \text{Formula II}$$

wherein, $R_1$ and $R_2$, which can be the same or different, and are independent substituents, respectively, are alkyl or cycloalkyl groups containing from 1 to 10 carbon atoms.

Formula III wherein, $R_3$ is an alkyl group containing from 2 to 10 carbon atoms.

DESCRIPTION OF THE RELATED ART

When polybutadiene is intended to be prepared via polymerization of 1,3-butadiene, the method of using lanthanum series metal catalyst, i.e., the elements from atom number 57 (La) to 71 (Lu), can provide diene polymer containing higher 1,4-cis content than other methods which comprise polymerizing one or more of conjugated dienes in the presence of transition metal compound such as nickel (Ni), titanium (Ti) and cobalt (Co).

Among lanthanum series metals, cerium(Ce), lanthanum (La), neodymium(Nd) and gadolinium(Gd) are known to have an excellent catalytic activity; among them, neodymium has the most excellent catalytic activity.

Many conventional methods for preparing polybutadiene (hereinafter referred to as "high cis-BR") using, lanthanum series metal as catalyst have been disclosed as follows:

i) a method of preparing high cis-BR in the presence of a catalyst prepared by mixing a neodymium salt compound, a silicon halide or an organosilicon halogen compound, an organoaluminium compound and a diene compound, followed by the aging process [PCT No. 93-05083];

ii) as the case of using a mixture containing more than two rare earth metal salts, a method of preparing high cis-BR in the presence of a catalyst prepared by mixing a didymium salt compound, an organoaluminium compound and a Lewis acid, followed by the aging process.

Here, the term didymium stands for a mixture of 72% of neodymium, 20% of lanthanum and 8% of praseodymium [U.S. Pat. Nos. 4,242,232, 4,260,707];

iii) a method of preparing a modified high cis-BR with excellent characteristics in such a manner that 1,3-butadiene is polymerized using a catalyst prepared by mixing a rare earth metal salt compound, a Lewis acid and/or Lewis base and organoaluminium compound in the presence or absence of diene compound, followed by the aging process; then some modifying compounds selected from the following components such as isocyanate, carbon disulfide, epoxy compound or organotin halide compound are added to the high cis-BR (U.S. Pat. Nos. 4,906,706, 5,064,910);

iv) a method of preparing high cis-BR in the presence of a catalyst prepared in such a manner that neodymium hydride, chlorine donor compound and electron donor ligand are reacted, followed by the addition of organoaluminium compound [U.S. Pat. No. 4,699,962];

v) a method of polymerizing 1,3-butadiene using a neodymium salt compound, an organic halide compound, an organic compound having hydroxyl group and an organoaluminium compound [Europe Patent No. 127,236];

vi) a method of preparing high cis-BR in the presence of an improved catalyst prepared in such a manner that a neodymium salt compound, an organic halide compound and an organoaluminium compound are mixed, followed by the aging process at lower than 0° C. [Europe Patent No. 375,421 and U.S. Pat. No. 5,017,539]; and, vii) a method of preparing high cis-BR in the presence of a catalyst prepared by mixing a neodymium salt compound, an organoaluminium compound, tris (pentafluorophenyl)boron or its derivative in the presence or absence of diene compound, followed by the aging process [Europe Patent No. 667,357].

However, the conventional methods have some difficulty in preparing polybutadiene to satisfy simultaneously both high 1,4-cis content and yield using a small amount of catalyst.

SUMMARY OF THE INVENTION

To comply with the aforementioned problems that the prior arts have encountered, the inventor et al. have made intensive studies and noted that high cis-BR can be prepared in a high yield using a catalyst prepared by aging a mixture of a neodymium salt compound, a nickel salt compound represented by the formula I, an organoaluminium compound and a borontrifluoride complex compound represented by the formula II and formula III. In consequence this invention is completed.

Therefore, an object of this invention is to provide a process for preparing polybutadiene with a very high 1,4-cis content in a high yield by polymerizing 1,3-butadiene in the presence of a catalyst consisting of a neodymium salt compound as a rare earth element metal and a nickel salt compound as a transition metal. With much remarked catalytic activity, polybutadiene with a very high 1,4-cis content can be prepared in a high yield using a small amount of catalyst.

DETAILED DESCRIPTION OF THE INVENTION

To achieve the above objective, this invention is characterized by process for preparing polybutadiene by polymerizing 1,3-butadiene in a nonpolar solvent in the presence of a catalyst prepared by aging a mixture of a neodymium salt compound, a nickel salt compound represented by the following formula I, an organoaluminium compound and a borontrifluoride complex compound represented by the following formula II and formula III in the presence or absence of a conjugated diene compound.

    Formula I

Wherein, R is an alkyl group, a cycloalkyl group, an aryl group or an arylalkyl group containing from 6 to 20 carbon atoms.

    Formula II wherein, $R_1$ and $R_2$, which can be the same or different, and are independent substituents, respectively, are alkyl or cycloalkyl groups containing from 1 to 10 carbon atoms.

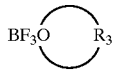    Formula III wherein, $R_3$ is an alkyl group containing from 2 to 10 carbon atoms.

This invention is explained in more detail as set forth hereunder.

The neodymium salt compound used in this invention is preferably carboxylate compound having a good solubility in non-polar solvents. For example, the neodymium compound includes compound selected from the group of neodymium hexanoate, neodymium heptanoate, neodymium octanoate, neodymium octoate, neodymium naphthenate, neodymium stearate and neodymium versatate; a carboxylate compound having more than 6 carbon atoms is preferred as the neodymium salt compound.

According to this invention, it is preferred to use a carboxylate compound as the nickel salt compound represented by the formula I, one of the active ingredients of catalyst, since it contains a ligand which has a good solubility to a nonpolar solvent. The examples of the nickel salt compound include nickel hexanoate, nickel heptanoate, nickel octanoate, nickel octoate, nickel naphthenate, nickel stearate and nickel versatate; a carboxylate compound having more than 6 carbon atoms is preferred as the nickel salt compound The examples of the borontrifluoride complex compound represented by the formula and formula III include borontrifluoride-dimethylether, borontrifluoride-diethylether, borontrifluoride-dibutylether and borontrifluoride-tetrahydrofuran.

Further, the examples of the commonly available organoaluminium compound include trimethylaluminium, triethylaluminium, tripropylaluminium, tributylaluminium, triisobutylaluminium, trihexylaluminium, trioctylaluminium and triusobutylaluminium hydride.

The polymerization catalyst for the manufacture of polybutadiene is prepared by aging a mixture of a neodymium salt compound, a nickel salt compound, an organoaluminium compound and a borontrifluoride complex compound. Hence, a nonpolar solvent should be selected as a solvent for aging the catalyst so as not to react with the catalyst. It is preferred to use cyclohexane, hexane, heptane or toluene as a nonpolar solvent.

Meantime, during the aging process of catalyst, the nickel salt compound represented by the formula I is mixed with the neodymium salt compound in the molar ratio of 1:20~20:1, preferably in the molar ratio of 2:8~8:2. If the ratio deviates the above range, the reaction yield becomes poor.

Further, the organoaluminium compound is mixed with the neodymium salt compound in the molar ratio of 1:1~200:1, preferably in the molar ratio of 10:1~150:1. If the ratio deviates the above range, the reaction yield is drastically-reduced or polymer having low molecular weight is generated.

Also, the borontrifluoride complex compound is mixed with the neodymium salt compound in the molar ratio of 0.1:1~10:1, preferably in the ratio of 0.5:1~5:1. If the ratio deviates the above range, the reaction yield becomes poor.

Further, the conjugated diene compound is mixed with the neodymium salt compound in the molar ratio of 1:1~30:1, preferably in the molar ratio of 2:1~10:1. If excess of the conjugated diene compound beyond the above range is employed, the viscosity of catalyst solution has increased.

The procedure for preparing an aging catalyst is that a neodymium compound solution in the presence or absence of a small portion of 1,3-butadiene is placed in a catalyst reactor under nitrogen atmosphere, followed by the addition of the nickel salt compound represented by the formula I, the organoaluminium compound and the borontrifluoride complex compound represented by the formula II and formula III. The aging of catalyst can be made in such order of addition or in modifying order.

After each compound is added to the reactor, the mixed catalyst is under the aging process. The aging process is performed at −20~60° C. for 5 minutes to 10 hours, preferably at 0~50° C. for 30 minutes to 2 hours. Thus the catalyst for polymerizing 1,3-butadiene is prepared.

1,3-butadiene monomer is polymerized using the catalyst, so prepared, to give polybutadiene with a very high 1,4-cis content according to this invention. The non-polar solvent used for the polymerization of 1,3-butadiene contains at least one or more of aliphatic hydrocarbons (e.g., butane, pentane, hexane, isopentane, heptane, octane and isooctane); cycloaliphatic hydrocarbons (e.g., cyclopentane, methylcyclopentane, cyclohexane, methylcyclohexane and ethylcyclohexane); aromatic hydrocarbons (e.g., benzene, toluene, ethylbenzene or xylene).

Since any nonpolar solvent used for this invention may significantly affect the polymerization, it should be added to the reactor after oxygen and water are entirely removed with this in mind, the polymerization of this invention is performed under a high-purity nitrogen atmosphere; the appropriate reaction temperature is from room temperature to 100° C. The polymerization is made for 2 hours under appropriate catalytic conditions to give polybutadiene in a high yield over 90%. The polymerization is completed by introducing polyoxyethyleneglycolether organophosphate as a reaction terminator and 2,6-di-t-butyl-p-cresol as a stabilizer. The resulting polybutadiene is precipitated with methanol or ethanol.

This invention is explained in more detail by the following examples but is not confined by these examples.

EXAMPLE 1

The Ziegler-Natta catalyst used for polymerization comprised neodymium versatate (1% cyclohexane solution) in the presence or absence of a small portion of 1,3-butadiene, nickel octoate (0.1% cyclohexane solution), triusobutylaluminium (15% hexane solution) and borontrifluoride-diethylether (1.5% toluene solution).

The aging of the catalyst was performed as follows: Neodymium versatate, nickel octoate, triisobutylaluminum and borontrifluoride-diethylether in a given amount (the molar ratio of each component was 0.7:0.3:30:1, respectively) were successively added to an 100 ml of round-bottom flask and aged at 20° C. for 1 hour under nitrogen.

The polymerization of 1,3-butadiene was performed using the catalyst generated from the aging process.

The polymerization process was performed as follows: Cyclohexane as a polymerization solvent, the Ziegler-Natta catalyst, aged as above, and 1,3-butadiene were added to a glass reactor which was sufficiently purged with nitrogen and reacted at 40° C. for 2 hours. The weight ratio of the polymerization solvent and 1,3-butadiene was 5:1. Then, the polymerization was completed by introducing polyoxyethyleneglycolether organophosphate as a reaction terminator and 2,6-di-t-butyl-p-cresol as a stabilizer.

EXAMPLES 2~8

Polybutadiene with a very high 1,4-cis content was prepared in the same manner as to Example 1, except for applying different catalyst ratios, as shown in the following table 1.

TABLE 1

| Category | Addition order of catalyst[1] | Molar ratio | Total contents of neodymium and nickel salts[2] |
| --- | --- | --- | --- |
| Example 1 | Nd(vers)$_3$/Ni(oct)$_2$/Al(i-Bu)$_3$/BF$_3$OEt$_2$ | 0.7:0.3:30:1 | 2.0 × 10$^{-4}$ mol |
| Example 2 | Nd(vers)$_3$/Ni(oct)$_2$/Al(i-Bu)$_3$/BF$_3$OEt$_2$ | 0.6:0.4:30:1 | 2.0 × 10$^{-4}$ mol |
| Example 3 | Nd(vers)$_3$/Ni(oct)$_2$/Al(i-Bu)$_3$/BF$_3$OEt$_2$ | 0.5:0.5:30:1 | 2.0 × 10$^{-4}$ mol |
| Example 4 | Nd(vers)$_3$/Ni(oct)$_2$/Al(i-Bu)$_3$/BF$_3$OEt$_2$ | 0.3:0.7:30:1 | 2.0 × 10$^{-4}$ mol |
| Example 5 | Nd(vers)$_3$/Ni(oct)$_2$/Al(i-Bu)$_3$/BF$_3$OEt$_2$ | 0.5:0.5:30:3 | 2.0 × 10$^{-4}$ mol |
| Example 6 | Nd(vers)$_3$/Ni(oct)$_2$/Al(i-Bu)$_3$/BF$_3$OEt$_2$ | 0.5:0.5:30:1.5 | 2.0 × 10$^{-4}$ mol |
| Example 7 | Nd(vers)$_3$/Ni(oct)$_2$/Al(i-Bu)$_3$/BF$_3$OEt$_2$ | 0.5:0.5:25:1 | 2.0 × 10$^{-4}$ mol |
| Example 8 | Nd(vers)$_3$/Ni(oct)$_2$/Al(i-Bu)$_3$/BF$_3$OEt$_2$ | 0.5:0.5:20:1 | 2.0 × 10$^{-4}$ mol |

Note:
[1]Nd(vers)$_3$: Neodymium verstate, Ni(oct)$_2$: Nickel octoate
[2]Content to 100 g of butadiene monomer

EXAMPLES 9~11

Polybutadiene with a very high 1,4-cis content was prepared in the same manner as Example 1, except that polymerization was performed using a different neodymium salt, nickel salt, borontrifluoride complex, and more than two organoaluminium compounds, as shown in the following table 2.

TABLE 2

| Category | Addition order of catalyst[1] | Molar ratio | Total contents of neodymium and nickel salts[2] |
| --- | --- | --- | --- |
| Example 9 | Nd(naph)$_3$/Ni(vers)$_2$/Al(i-Bu)$_3$/AlH(i-Bu)$_2$/BF$_3$OBu$_2$ | 0.5:0.5:30:2.5:1.5 | 2.0 × 10$^{-4}$ mol |
| Example 10 | Nd(octa)$_3$/Ni(octa)$_2$/Al(i-Bu)$_3$/AlH(i-Bu)$_2$/BF$_3$THF | 0.5:0.5:30:5:1.5 | 2.0 × 10$^{-4}$ mol |
| Example 11 | Nd(oct)$_3$/Ni(naph)$_2$/Al(i-Bu)$_3$/AlH(i-Bu)$_2$/BF$_3$OMe$_2$ | 0.5:0.5:24:6:1.5 | 2.0 × 10$^{-4}$ mol |

Note:
[1]Nd(naph)$_3$:Neodymium naphthenate, Nd(octa)$_3$: Neodymium octanoate, Nd(oct)$_3$: Neodymium octoate
[2]Content to 100 g of butadiene monomer Ni(vers)$_2$: Nickel versatate Ni(octa)$_2$: Nickel octanoate Ni(naph)$_2$: Nickel naphthenate

COMPARATIVE EXAMPLES 1~3

1,4-cis polybutadiene was prepared in the same manner as Example 1, except that polymerization was performed without using the nickel salt, as shown in the following table 3.

TABLE 3

| Category | Addition order of catalyst[1] | Molar ratio | Contents of neodymium salt[2] |
| --- | --- | --- | --- |
| Comparative example 1 | Nd(vers)$_3$/Al(i-Bu)$_3$/BF$_3$OEt$_2$ | 1:30:1 | 2.0 × 10$^{-4}$ mol |
| Comparative example 2 | Nd(vers)$_3$/Al(i-Bu)$_3$/BF$_3$OEt$_2$ | 1:20:1 | 2.0 × 10$^{-4}$ mol |
| Comparative example 3 | Nd(vers)$_3$/Al(i-Bu)$_3$/BF$_3$OEt$_2$ | 1:20:1 | 5.7 × 10$^{-4}$ mol |

Note:
[1]Nd(vers)$_3$: Neodymium versatate
[2]Content to 100 g of butadiene monomer

EXPERIMENTAL EXAMPLE 1

The 1,4-cis content and the conversion for the prepared polybutadiene in Examples 1 to 11 and Comparative Examples 1 to 3 were measured, and the results were shown in the following table 4. The 1,4-cis content was measured by the Morero method (*Chim. Indust.*, Vol 41, p758, 1959).

TABLE 4

| Category | 1,4-cis content (%) | Yield (%) |
| --- | --- | --- |
| Example 1 | 98.5 | 99 |
| Example 2 | 97.0 | 93 |
| Example 3 | 98.6 | 100 |
| Example 4 | 96.5 | 85 |
| Example 5 | 98.3 | 100 |
| Example 6 | 98.1 | 100 |
| Example 7 | 98.0 | 93.3 |
| Example 8 | 98.2 | 91.7 |
| Example 9 | 98.3 | 100 |
| Example 10 | 98.1 | 95 |
| Example 11 | 98.0 | 95 |
| Comparative example 1 | 98.2 | 54 |
| Comparative example 2 | — | 0 |
| Comparative example 3 | 98.0 | 53.3 |

As described above in more detail, this invention provides a process for preparing polybutadiene by polymerizing 1,3-butadiene monomer using a catalyst prepared by aging a mixture of a neodymium salt compound, a nickel salt compound, an organoaluminium compound and a borontrifluoride complex compound in the presence or absence of a conjugated diene compound. With much remarked catalytic activity, polybutadiene with a very high 1,4-cis content can be prepared in a high yield using a small amount of catalyst.

What is claimed is:

1. A process for preparation of 1,4-cis polybutadiene which consists of polymerizing 1,3-butadiene in a non-polar solvent using a catalyst, having high activity in stereoregularity and in conversion, prepared by aging a mixture of a neodymium salt, a nickel salt represented by the following formula I, an organoaluminium compound and a borontrifluoride complex represented by the following formula II or formula III in the presence or absence of a conjugated diene compound:

  Formula I wherein, R is an alkyl group, a cycloalkyl group, an aryl group or an arylalkyl group containing from 6 to 20 carbon atoms;

  Formula II wherein, $R_1$ and $R_2$, which can be the same or different, and are independent substituents, respectively, are alkyl or cycloalkyl groups containing from 1 to 10 carbon atoms;

  Formula III wherein, $R_3$ is a divalent alkyl group containing from 2 to 10 carbon atoms.

2. The process according to claim 1, wherein said neodymium salt is selected from a group consisting of neodymium hexanoate, neodymium heptanoate, neodymium octanoate, neodymium octoate, neodymium naphthenate, neodymium stearate, neodymium versatate and mixtures thereof.

3. The process according to claim 1, wherein said nickel salt represented by the formula I is selected from a group consisting of nickel hexanoate, nickel heptanoate, nickel octanoate, nickel octoate, nickel naphthenate, nickel stearate, nickel versatate and mixtures thereof.

4. The process according to claim 1, wherein said organoaluminum compound is selected from a group consisting of trimethylaluminum, triethylaluminum, tripropylaluminum, tributylaluminum, triusobutylaluminum, trihexylaluminum, trioctylaluminum, diIsobutylaluminum hydride and mixtures thereof.

5. The process according to claim 1, wherein said borontrifluoride complex represented by formula II or formula III is selected from the group of borontrifluoride-dimethylether, borontrifluoride-diethylether, borontrifluoride-dibutylether, borontrifluoride-tetrahydrofuran and mixtures thereof.

6. The process according to claim 1, wherein the molar ratio of said nickel salt to neodymium salt in said mixture is 1:20 to 20:1.

7. The process according to claim 1, wherein the molar ratio of said borontrifluoride complex to neodymium salt in said mixture is 0.1:1 to 10:1.

8. The process according to claim 1, wherein the aging process of said catalyst is performed at −20~60° C. for 5 minutes to 10 hours.

9. The process according to claim 1, wherein the molar ratio of said conjugated diene compound to neodymium salt in said mixture is 1:1 to 30:1.

* * * * *